United States Patent [19]

Takasaki

[11] Patent Number: 4,796,281
[45] Date of Patent: Jan. 3, 1989

[54] DIGITAL SIGNAL TRANSMISSION SYSTEM

[75] Inventor: Yoshitaka Takasaki, Tokorozawa, Japan

[73] Assignee: Hitachi, Ltd., Tokyo, Japan

[21] Appl. No.: 919,458

[22] Filed: Oct. 16, 1986

[30] Foreign Application Priority Data

Oct. 16, 1985 [JP] Japan .................................. 60-228675

[51] Int. Cl.$^4$ ............................................. H04L 7/00
[52] U.S. Cl. ...................................... 375/112; 375/84; 375/102
[58] Field of Search ................... 375/111, 112; 370/84, 370/102

[56] References Cited

U.S. PATENT DOCUMENTS 4,025,720  5/1977  Pachynski, Jr. ...................... 375/112
4,484,327  11/1984  Hanson ........................... 375/112 X
4,661,966  4/1987  Schreiner ............................. 375/112

Primary Examiner—A. D. Pellinen
Assistant Examiner—Derek S. Jennings
Attorney, Agent, or Firm—Antonelli, Terry & Wands

[57] ABSTRACT

A digital signal transmission system which converts first digital signals having a given bit rate into second digital signals having a predetermined bit rate to transmit them. The first digital signals are written into a buffer memory at a bit rate of the first digital signals, and the written signals are read from the first buffer memory at a bit rate of said second digital signals. The reading of the digital signals is carried out with a clock signal which consists of synchronous portions that read the written signals at any time and asynchronous portions that read the written signals depending upon the condition of the written signals. The second digital signals are sent after adding a data signal to the asynchronous portions of the digital signals. A second buffer memory receives the sent second digital signals and temporarily stores them by writing the second digital signals at the bit rate of said second digital signals, and reading the written signals from the second buffer memory at a bit rate of the third digital signals, the reading of the third digital signals depending upon signals of the asynchronous portions of the second digital signals.

7 Claims, 4 Drawing Sheets

DIGITAL SIGNAL TRANSMISSION SYSTEM

BACKGROUND OF THE INVENTION

1. Field of hhe Invention:

The present invention relates to a digital signal transmission system, and particularly to a digital signal synchronizing system which converts an operation speed (bit rate) of given digital signals to be transmitted into an operation speed (bit rate) of a predetermined transmission system (which includes repeaters and the like).

2. Description of the Prior Art:

A conventional digital signal transmission system has been so designed that the bit rate of digital signals to be transmitted is in agreement with the bit rate of the transmission system. When the two bit rates are not the same, therefore, it is not allowed to directly transmit the digital signals.

It is therefore necessary to provide a signal format converter at the sending terminal and at the receiving terminal to establish synchronism with respect to the bit rate of the transmission system. The signal format converter requires a buffer circuit which makes it very difficult to input (write) and output (read) the signals continuously, i.e., in real time. Therefore, the system which is provided with the buffer circuit and which synchronizes the bit rate is limited to a start-stop transmission system which deals with particular digital signals only.

Moreover, it is impossible to multiplex a plurality of asynchronous signals.

Therefore, it is accepted practice to set the bit rate of the transmission system to be in agreement with the bit rate of digital signals that are to be transmitted, or to set the bit rate of digital signals that are to be transmitted to be in agreement with the bit rate ff the transmission system.

Accompanying the development in the digital signal processing technology, however, the number of sending terminals or channels has increased to generate digital signals of many kinds having different bit rates. At the present time where a high-speed transmission is made possible by using a transmission medium of a very broad band such as an optical fiber, furthermore, it will be very advantageous to economically utilize the transmission line if signals having a given bit rate can be transmitted irrespective of the bit rate of the transmission system. Moreover, if these signals could be transmitted as multiplexed signal, the easiness for using the transmission line can be strikingly improved.

The inventor of the present application has already proposed a digital signal transmission system which transmits given digital signals having a bit rate smaller than the bit rate of a transmission system in synchronism with the transmission system in real time (U.S. Pat. No. 4,330,856). This digital transmission system transmits input digital signals having any bit rate by converting them, via a signal format converter, into digital signals having a bit rate higher than the above-mentioned bit rate. Here, the signal format converter comprises a buffer circuit of a small capacity, a circuit which writes onto the buffer circuit at the bit rate of the input digital signals and reads at the bit rate of the transmission system, a circuit which distinguishes the signals that are read out as mark, space or blank, and a coding equipment which converts the mark, space or blank into pulse signals that can be identified with a time slot length of the transmission system or an integer number of times thereof as a reference, depending upon the level of the pulses or the number (run length) of the continuing pulses. That is, as shown in FIG. 1, "1" is converted into "11" or "00", "0" is converted into "1" or "0", and "empty" is converted into "111" or "000". Therefore, when "1" is generated continuously, the efficiency becomes 50%. When "1" and "0" are generated equally, the efficiency becomes about 75%. In this case, however, the system is used at an efficiency of about 60% by taking the safety coefficient into consideration against the overflow. With this system, therefore, the conversion efficiency is as low as about 50 to 60%.

Further, a so-called pulse stuffing system has been known to obtain the conversion efficiency which is close to 100%. According to the pulse stuffing system as shown in FIG. 2, when the original digital signals (a) are to be converted into digital signals (b) having a slightly high bit rate, the difference in the bit rate is adjusted using a stuff pulse St. The position of the stuff pulse St is indicated by a stuff indicating pulse (c). Usually, the digital signals (b) and the stuff indicating pulse (c) are transmitted while being synthesized together. However, when the bit rate is too different between the original digital signals and the digital signals having a high bit rate, the stuff indicating pulse (c) is generated frequently, wnereby the conversion efficiency decreases and it becomes difficult to distinguish the digital signals (b) over the stuff indicating pulses (c). Therefore, the pulse stuffing system can synchronize the digital signals only when they have bit rates that are very close to each other.

SUMMARY OF THE INVENTION

The object of the present invention is to provide a system which is capable of efficiently bringing the digital signals of any bit rate into synchronism with signals of a predetermined bit rate.

To achieve the above object according to the present invention, the signals are divided into synchronous portions and asynchronous portions, the asynchronous portions only are coded into codes that correspond to "1", "0" or "empty", and are synthesized with the synchronous portions and are transmitted, and the operation is carried out in a reverse manner in te receiving portion to obtain the original signals.

According to the present invention, a digital signal transmission system which converts first digital signals having a given bit rate into second digital signals having a predetermined bit rate to transmit them, comprises:

first means which generates said first digital signals;

second means which converts the first digital signals from said first means into said second digital signals;

third means which transmits said second digital signals from said second means;

fourth means which converts said second digital signals from said third means into third digital signals; and fifth means which receives said third digital signals from said fourth means; wherein said second means is comprised of:

a first buffer memory which temporarily stores said first digital signals;

means which writes said first digital signals onto said first buffer memory at a bit rate of said first digital signals, and which reads the written signals of said first buffer memory at a bit rate of said second digital signals, said means reading the digital signals with a clock signal which consists of synchronous portions that read the written signals at any times, and asynchronous portions that read the written signals depending upon the condition of the written signals; and means which sends the second digital signals after adding a data signal to the asynchronous portions of the digital signals read by said reading means, said data signal indicating whether the written signal is read out or not;

and wherein said fourth means is comprised of:

a second buffer memory which receives said second digital signals and temporarily stores them; and means which writes said second digital signals onto said second buffer memory at the bit rate of said second digital signals, and which reads the written signals from said second buffer memory at a bit rate of the third digital signals, said means reading the third digital signals depending upon signals of the asynchronous portions of said second digital signals.

According to the present invention, the continuous digital signals can be efficiently brought into synchronism with any bit rate, contributing to improve the flexibility and the transmission efficiency.

These and other objects and many of the attendant advantages of this invention will be readily appreciated as the same becomes better understood by reference to the following detailed description when considered in connection with the accompanying drawings.

DETAILED DESCRIPTION OF THE PREFERRED EMBODIMENT

An embodiment of the present invention will now be described in conjunction with the drawings.

Figure 1:
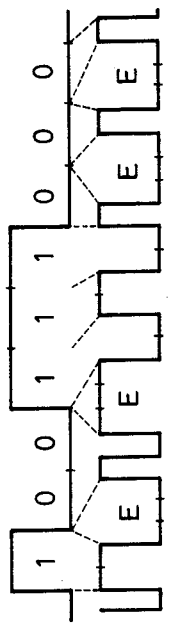
FIG. 1 is a diagram which explains a conventional synchronizing system.
Figure 2:
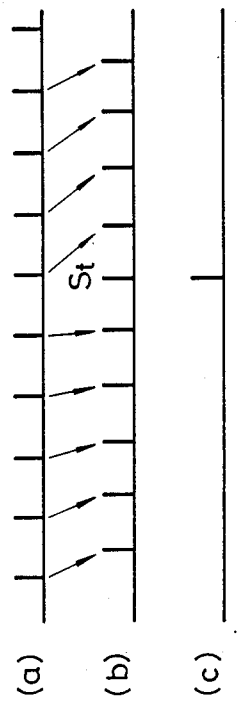
FIG. 2 is a diagram which explains a conventional pulse stuffing system.
Figure 3:
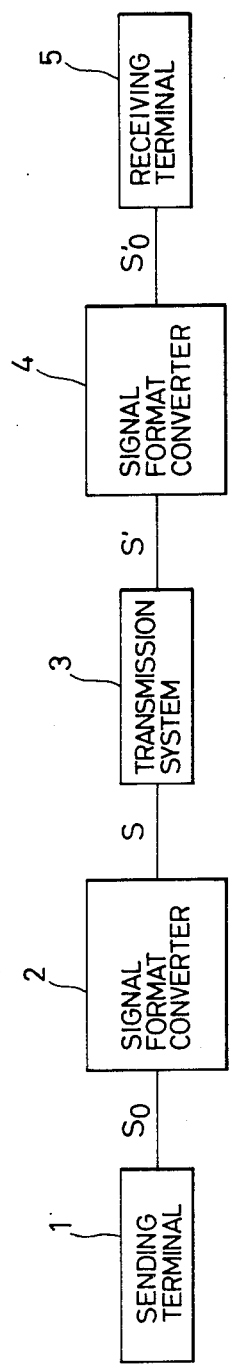
FIG. 3 is a block diagram which illustrates the whole structure of a digital signal transmission system according to the present invention.

FIG. 3 is a block diagram illustrating the whole structure of a digital signal transmission system according to an embodiment of the present invention.

In FIG. 3, a sending terminal 1 generates digital signals to be transmitted, such as video audio and/or data. A signal format converter 2 converts digital signals of any bit rate generated by the sending terminal 1 into digital signals of a bit rate of a transmission system 3 which includes repeaters and the like. A signal format converter 4 is a coding equipment which demodulates the original digital signals according to the operation opposite to that of the signal format converter 2. A receiving terminal 5 demodulates the digital signals that are received.

Figure 4:
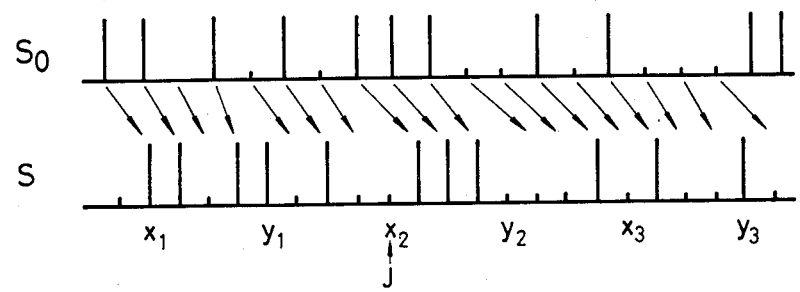
FIG. 4 is a time chart which explains the concept of the digital signal transmission system according to the present invention.

FIG. 4 is a time chart which explains an embodiment of the present invention. The embodiment of the invention will now be described with reference to this time chart. A train of original digital signal pulses $S_0$ sent from the sending terminal 1 are synchronized to result in a train of synchronized digital signal pulses S in which each element corresponds as indicated by arrows. Portions indicated by x and y in the pulse train S are asynchronous portions, and other portions are synchronous portions. The original signal pulses $S_0$ may be or may not be inserted in the portion x. Though the details will be described later, whether the pulses are inserted or not is determined as described below. The bit rate of the oiiginal signal pulse train $S_0$ is smaller than the bit rate (strictly, the bit rate which does not include pulses with a mark y) of the synchronized signal pulse train S. Therefore, if the pulses of the original signal pulse train $S_0$ are continued to be transferred into the synchronized signal pulse train S, the number pulses could beome short of supply. That is, transfer of the pulses requires that, the pulses in the original signal pulse train $S_0$ must lead the synchronized signal pulse train S as indicated by arrows in the drawing. The leading grade decreases with the lapse of time. In a practical system, however, the pulses in the original signal pulse train $S_0$ must lead the pulses of the synchronized signal pulse train S by more than a predetermined period of time to maintain margin. When the leading grade becomes smaller than a predetermined value, therefore, the transfer of pulse into the portion x is omitted one time (a portion of arrow J in FIG. 4). This makes it possible to increase the leading grade and to continue the transfer operation with sufficient margin.

When the transfer of pulse into the portion x is omitted, space (without pulse) is inserted in a subsequent portion y, and when the pulse is transferred, a mark (with pulse) is inserted to distinguish them.

The embodiment of encoding of FIG. 4 will now be described with reference to FIGS. 5 to 8.

Figure 5:
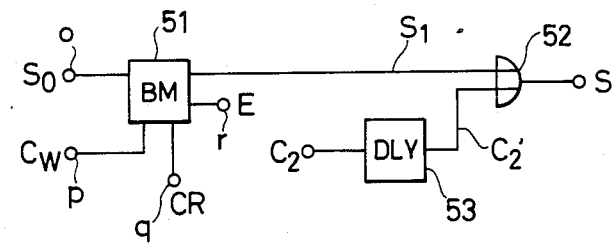
FIG. 5 is a diagram which explains in detail a signal format converter 2 of FIG. 3.
Figure 6:
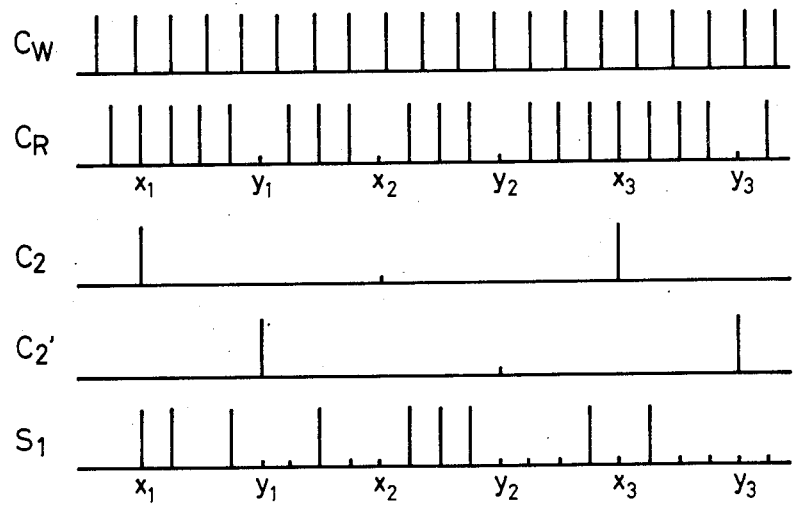
FIG. 6 is a time chart for explaining the operation of FIG. 5.

The original signal pulse train $S_0$ shown in FIG. 4 is applied to an input terminal 0 of a buffer memory (BM) 51 of FIG. 5. The signals are written into the buffer memory 51 by write pulses $C_W$. The written pulses are read by read pulses $C_R$ applied to a terminal q of the buffer memory 51. How to produce the read pulses $C_R$ will be described later. As shown in FIG. 6, the signals are not read at time point y, the signals are read at time point x when the leading grade is great, and the signals are not read at time point x when the leading grade is small.

The read signals $S_1$ are synthesized with the read indication pulses $C_2'$ through an OR gate 52 thereby to obtain a synchronized signal pulse train S in an encoded form.

The rea indication pulse $C_2'$ is obtained as described below. That is, the pulse train $C_2$ of FIG. 6 has a mark (with pulse) when the pulse is to be transferred at time point x in the read pulse train $C_R$ and has a space (without pulse) when the pulse is not to be transferred. The pulse train $C_2$ is delayed to a position y by a delay line 53 of FIG. 5 to obtain a read indication pulse train $C_2'$. Thus, there is indicated whether the pulse is "transferred" or "not transferred".

The read pulse train $C_R$ and the pulse train $C_2$ of FIG. 6 can be obtained by using "empty" pulses E sent from the buffer emory 51 of FIG. 5. This will be described with reference to FIGS. 7 and 8.

Figure 7:
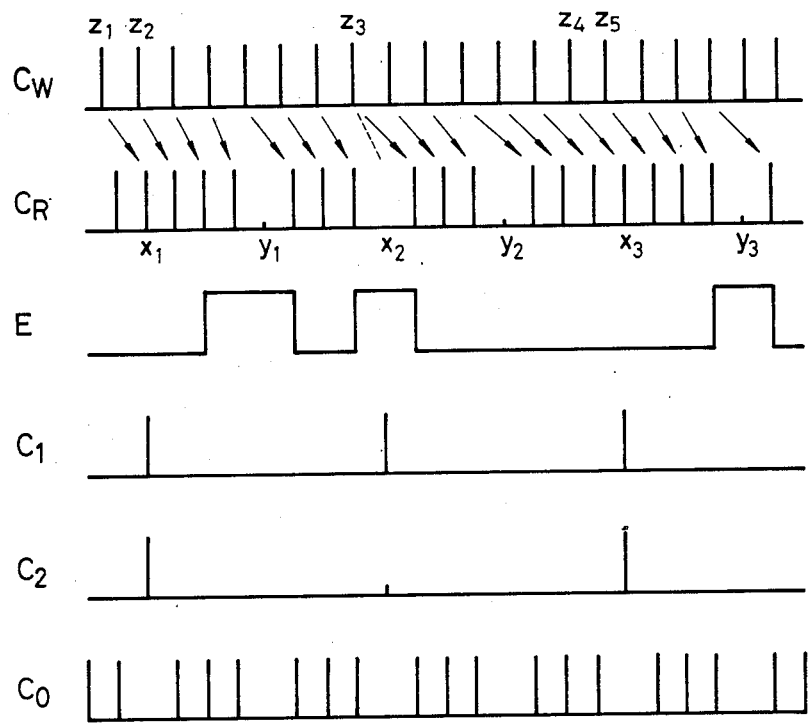
FIG. 7 is a diagram which explains the steps for forming the read pulses $C_R$ of FIG. 6.

The original signals $S_0$ are written onto the buffer memory 51 of FIG. 5 using the write pulse train $C_W$ of FIG. 7 and are read out using the write pulse train $C_R$ of FIG. 7. As described earlier, in this case, the write pulses $C_W$ must lead the read pulses $C_R$ with sufficient margin.

Whether the pulse be read or not at the portion marked with x in the read pulse train $C_R$ of FIG. 7 is determined depending upon the degree of margin. This will be described below in further detail.

There exist three x marks in the read pulse train $C_R$ of FIG. 7. First, if attention is given to a moment $x_1$, there are two pulses ($z_1$, $z_2$) in the write pulse train $C_W$ that precede the pulse $x_1$. This indicates that two signals have been stored in the buffer memory 51 of FIG. 5 at a moment just before a signal is read at the moment $x_1$.

If attention is given to a second moment $x_2$, there is only one z mark ($z_3$) indicating that only one signal is stored in the memory. If the signal is read out, therefore, the memory becomes empty, and there remains no maggin for reading. In such a case, the signal is not read at the moment $x_2$.

This helps increase the degree of margin, and it will be understood that two pulses ($z_4$, $z_5$) are stored in the memory at a third moment $x_3$.

A signal E of FIG. 7 represents the case where the buffer memory contains one signal or less signal at every moment in the read pulse train $C_R$ of FIG. 7. A section of mark indicates this fact which is produced as an "empty" signal E from the terminal of the buffer memory 11 of FIG. 5.

If the pulse train $C_1$ of FIG. 7 is inhibited by the "empty" signal E in an AND circuit 81, there is obtained a pulse train $C_2$. This can be used as the pulse train $C_2$ of FIG. 5.

Figure 8:
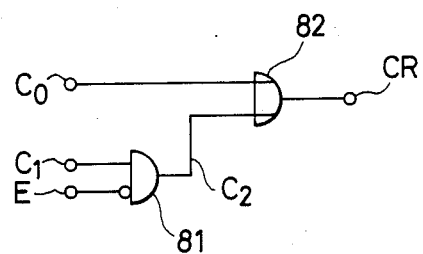
FIG. 8 is a diagram which shows in detail a circuit that forms read pulses $C_R$ of FIG. 6.

The pulse train $C_2$ is synthesized with the pulse train $C_0$ of FIG. 7 through an OR circutt 82 to obtain the read pulse train $C_R$. FIG. 8 shows an embodiment for putting this operation into practice.

The signal format converter 4 which receives the thus coded pulse train S and demodulates it into the original pulse train will now be described with reference to FIGS. 9 to 11.

Figure 9:
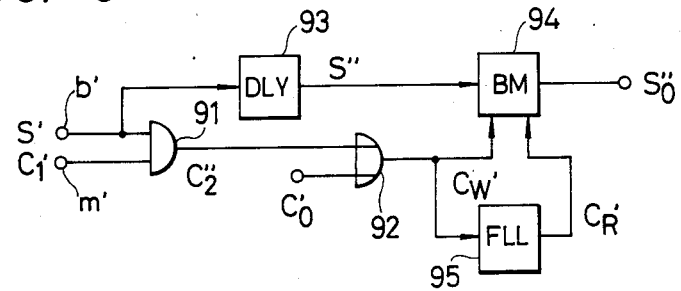
FIG. 9 is a diagram which explains in detail a signal format converter 4 of FIG. 3.
Figure 10:
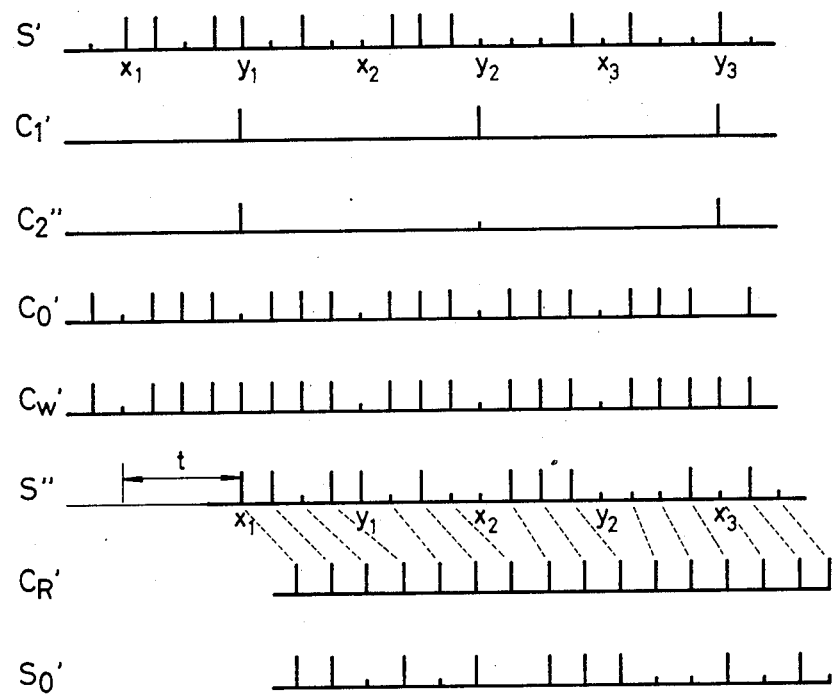
FIG. 10 is a time chart for explaining the operation of FIG. 9.

In FIG. 9, the received pulse train S' is applied to an input terminal b'. Portions marked with y in the pulse train S' are sampld by an AND gate 91. A pulse train $C_1'$ pling is added to an input terminal m'. As a result, there is obtained a pulse train $C_2''$. If the pulse train $C_2''$ and a pulse train $C_0'$ are synthesized together through an AND gate 92, there is obtained a write pulse train $C_W'$. Using the write pulse train $C_W'$, the pulse train S'' delayed by a delay line 93 by a time t is written onto a buffer memory 94. In this case, signals of the pulse train S''' corresponding to $y_1$, $x_2$, $y_2$ and $y_3$ are not written. The read pulses $C_R'$ ten onto the buffer memory 94 are successively read out, and are converted into demodulated signals $S_0'''$.

The pulse trains $C_1'$ and $C_0'$ FIG. 9 are generated from the received pulse train S' relying upon the word synchronization technology. That is, there are only three kinds of combinations of x and y in the received pulse train, i.e., (x=0, y=0), (x=1, y=1) and (x=0, y=1), and there does not exist a combination (x=1, y=0). When the combination (x=1, y=0) has took place, therefore, it is so considered that the pulses are out of synchronism, and the phase of the synchronization counter is deviated by one bit to observe the conditoon. Thus, the phase is deviated one bit by one bit repetitively until the pulses are brought back into synchronism, in order to obtain the pulse trains $C_1'$ and $C_0'$.

Figure 11:
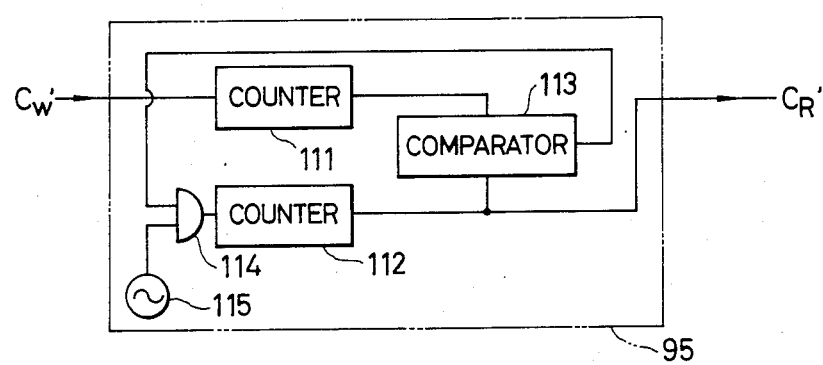
FIG. 11 is a diagram which shows in detail an FLL 95 of FIG. 9.

A frequency locked loop 95 which converts the write pulses $C_W'$ into the read pulses $C_R'$ of FIG. 9 is constructed as shown in FIG. 11. First, a counter 111 counts the clock rate of the write pulses $C_W'$. A counter 112 counts the clock rate of a built-in clock 115. A comparator 113 compares the result of the counter 111 with the result of the counter 112, and subtracts a pulse via a gate 114 when the clock rate of the built-in clock 115 is faster than the above clock rate. Owing to the above operation, time distances between the write pulses $C_W'$ are averaged to generate read pulses $C_R'$.

The above embodiment has dealt with the case where the synchronous portions and the asynchronous portions of the coded pulse train has arratio of 3 to 1. However can be changed depending upon the situations. The efficiency increases with the increase in the ratio of the synchronous portions. Further, the pulse train can be synchronized into 20 any bit rate by increasing the ratio of the asynchronous portions of by leaving unused pulses in the synchronous portions.

In the above description, furthermore, the number of coding digits in the asynchronous portions was two consisting of x and y. However, the number of coding digits may be increased so that the signals are little affected by errors.

I claim:

1. A digital signal transmission system which converts first digital signals having a given bit rate into second digital signals having a predetermined bit rate to transmit them, comprising:
   first means which generates said first digital signals;
   second means which converts the first digital signals from said first means into said second digital signals;
   third means which transmits said second digital signals from said second means;
   fourth means which converts said second digital signals from said third means into third digital signals; and
   fifth means which receives said third digital signals from said fourth means; wherein said second means is comprised of:
   a first buffer memory which temporarily stores said first digital signals;
   means which writes said first digital signals onto said buffer memory at a bit rate of said first digital signals, and which reads the written signals from said first buffer memory at a bit rate of said second digital signals, said means reading the digital signals with a clock which consists of synchronous portions that read the written signals at any times and asynchronous portions that read the written signals depending upon the condition of the written signals; and
   means which sends the second digital signals after adding a data signal to the asynchronous portions of the digital signals read by said reading means, said data signal indicating whether the written signal is read out or not; and wherein said fourth means is comprised of:

a second buffer memory which receives said second digital signals and temporarily stores them; and means which writes said second digital signals onto said second buffer memory at the bit rate of said second digital signals, and which reads the written signals from said second buffer memory at a bit rate of the third digital signals, said means reading the third digital signals depending upon signals of the asynchronous portions of said second digital signals.

2. A digital signal transmission system according to claim 1, wherein means which writes signals onto said second buffer memory and reads them therefrom, reads at an equal interval, as said third digital signals, the signal pulses that are selected from the synchronous portions and asynchronous portions of said second digital signals.

3. A digital signal transmission system according to claim 1, wherein means which writes signals onto said second buffer memory and reads them therefrom, comprises:

means which detects said data signals added to asynchronous portions of said second digital signals; and means which writes onto said second buffer memory the synchronous portions and the signals that are contained in the asynchronous portions of said second digital signals.

4. A digital signal transmission system according to claim 1, wherein a bit rate of said first digital signals is equal to a bit rate of said third digital signals.

5. A digital signal transmission method which converts first digital signal having a given bit rate into second digital signals having a predetermined bit rate to transmit them, comprising:

a step for sending said first digital signals;

a step which divides said first digital signals into synchronous portions and asynchronous portions, and which encodes the signals of said asynchronous portions to add thereto the data that indicates whether said first digital signals exist in said asynchronous portions;

a step for transmitting said converted second digital signals;

a step which detects the signals of said asynchronous portions from said second digital signals that are received, and which adds the detected signals of the asynchronous portions to the signals of the synthronous portions to convert them into third digital signals; and a step for receiving said converted third digital signals.

6. A digital signal transmission method according to claim 5, wherein said asynchronous portions are encoded using codes that corresponds to "1", "0" and "empty".

7. A signal format converter which converts first digital signals having a given bit rate into second digital signals having a predetermined bit rate, comprising:

a buffer memory which temporarily stores said first digital signals;

first means connected to said buffer memory for writing said first digital signals onto said buffer memory at a bit rate thereof and reading the written signals from said buffer memory at a bit rate of said second digital signals, and said first means reading the signals with a clock signal that comprises synchronous portions which read said written signals at all times and asynchronous portions which read said written signals depending upon the conditions of said written signals; and second means connected to said buffer memory for sending said second digital signals be adding thereto a data signal that indicates whether said written signals are read onto asynchrounous portions of the digital signals read out by said reading means.

* * * * *